US011483136B2

(12) United States Patent
Lidzborski et al.

(10) Patent No.: US 11,483,136 B2
(45) Date of Patent: Oct. 25, 2022

(54) WRAPPED KEYS WITH ACCESS CONTROL PREDICATES

(71) Applicant: Google LLC, Mountain View, CA (US)

(72) Inventors: Nicolas Lidzborski, Mountain View, CA (US); Laetitia Estelle Baudoin, Mountain View, CA (US)

(73) Assignee: Google LLC, Mountain View, CA (US)

( * ) Notice: Subject to any disclaimer, the term of this patent is extended or adjusted under 35 U.S.C. 154(b) by 105 days.

(21) Appl. No.: 16/709,334

(22) Filed: Dec. 10, 2019

(65) Prior Publication Data

US 2021/0176050 A1 Jun. 10, 2021

(51) Int. Cl.
*H04L 29/06* (2006.01)
*H04L 9/08* (2006.01)
*H04L 9/32* (2006.01)

(52) U.S. Cl.
CPC .......... *H04L 9/0825* (2013.01); *H04L 9/0822* (2013.01); *H04L 9/0866* (2013.01); *H04L 9/0877* (2013.01); *H04L 9/3213* (2013.01)

(58) Field of Classification Search
CPC ... H04L 9/0825; H04L 9/0822; H04L 9/0866; H04L 9/0877; H04L 9/0894; H04L 9/32; H04L 9/3213; H04L 63/0428; H04L 63/10; H04L 63/062; G06F 21/62
See application file for complete search history.

(56) References Cited

U.S. PATENT DOCUMENTS

| 8,601,263 | B1* | 12/2013 | Shankar | H04L 63/0428 713/166 |
|---|---|---|---|---|
| 8,909,943 | B1 | 12/2014 | Shankar et al. | |
| 8,914,632 | B1* | 12/2014 | Shankar | G06F 21/6209 713/167 |
| 8,996,887 | B2 | 3/2015 | Kadatch et al. | |
| 9,148,283 | B1 | 9/2015 | Shankar et al. | |
| 9,984,238 | B1 | 5/2018 | Roth et al. | |
| 10,298,402 | B2* | 5/2019 | Isles | H04L 63/045 |
| 2005/0058294 | A1 | 3/2005 | Chen et al. | |
| 2008/0063206 | A1 | 3/2008 | Karp et al. | |
| 2011/0225202 | A1* | 9/2011 | Man | G06F 21/6218 707/785 |
| 2012/0284530 | A1 | 11/2012 | Takashima et al. | |
| 2013/0227303 | A1* | 8/2013 | Kadatch | G06F 21/6218 713/193 |
| 2014/0096210 | A1* | 4/2014 | Dabbiere | G06F 21/316 726/5 |
| 2016/0036826 | A1* | 2/2016 | Pogorelik | H04L 63/0428 726/1 |
| 2016/0148021 | A1 | 5/2016 | Wong et al. | |
| 2017/0344728 | A1* | 11/2017 | Steele | H04L 9/3231 |
| 2019/0318102 | A1 | 10/2019 | Araya et al. | |
| 2020/0076794 | A1* | 3/2020 | de Boer | H04L 63/0869 |

* cited by examiner

*Primary Examiner* — Yogesh Paliwal

(74) *Attorney, Agent, or Firm* — Honigman LLP; Brett A. Krueger

(57) ABSTRACT

A method for wrapped keys with access control predicates includes obtaining a cryptographic key for content. The method also includes encrypting the content using the cryptographic key and generating an encryption request. The encryption request requests that a third party cryptography service encrypts an encapsulation of the cryptographic key and an access control condition governing access to the content. The method also includes communicating the encryption request to the third party cryptography service. The encryption request includes the cryptographic key.

20 Claims, 6 Drawing Sheets

WRAPPED KEYS WITH ACCESS CONTROL PREDICATES

TECHNICAL FIELD

This disclosure relates to wrapped keys with access control predicates.

BACKGROUND

Today cloud computing platforms (CCPs) may provide a wide range of functionality to clients (or users) of these platforms. In some cases, this functionality has evolved from more simple offerings, such as storage for client resources or providing additional distributed computing resources to clients, to more complex offerings of applications or application programming interfaces (APIs) that may integrate with other computing systems. For example, many CCPs offer software services, such as electronic mail applications, communication applications (e.g., messaging, audio/visual communication, etc.), storage applications, data processing application, etc. As these software services have grown, more and more client data is being accessed, transferred, modified, and/or stored during the use of these services.

SUMMARY

One aspect of the disclosure provides a method for wrapped keys with access control predicates. The method includes obtaining, at data processing hardware, a cryptographic key for content associated with a user. The method also includes encrypting, by the data processing hardware, the content using the cryptographic key and generating, by the data processing hardware, an encryption request. The encryption request requests that a third party cryptography service encrypts an encapsulation of the cryptographic key and an access control condition governing access to the content of the user. The method further includes communicating, by the data processing hardware, the encryption request to the third party cryptography service, the encryption request including the cryptographic key.

Implementations of the disclosure may include one or more of the following optional features. In some implementations, the encryption request includes the access control condition, the access control condition configured by the user associated with the content. The encryption request requesting that the third party encrypts the encapsulation may include the encryption request requesting the third party cryptography service to encrypt the encapsulation using a symmetric encryption with a key encryption key (KEK). The third party cryptography service may correspond to a key service manager (KSM) of a distributed storage system or a hardware security module (HSM) device of a distributed storage system. The access control condition may correspond to a respective condition for dynamic access control.

In some examples, the method includes receiving, at the data processing hardware, a decryption request to decrypt the encrypted content associated with the user and the method includes communicating, by the data processing hardware, to the third party cryptography service, the decryption request to decrypt the encapsulation of the cryptographic key for the content and the access control condition governing access to the content of the user subject to the decryption request. In this example, when the decryption request satisfies the access control condition, the method includes retrieving, by the data processing hardware, the cryptographic key from the third party cryptography service and decrypting, by the data processing hardware, the encrypted content using the cryptographic key. The decryption request may include an authentication token, the authentication token indicating that a requestor of the decryption request is authorized to receive the cryptographic key. Here, the authentication token may include a JavaScript object notation (JSON) web token, the JSON web token including a signature based on a public key infrastructure (PKI) certificate.

Another aspect of the disclosure provides a method for wrapped keys with access control predicates. The method includes receiving, at data processing hardware, a decryption request to decrypt encrypted content associated with a user. The method also includes communicating, by the data processing hardware, to a third party cryptography service. The decryption request decrypts an encapsulation of a cryptographic key for the content and an access control condition governing access to the content of the user subject to the decryption request, the encapsulation originally encrypted by the third party cryptography service. When the decryption request satisfies the access control condition, the method includes retrieving, by the data processing hardware, the cryptographic key from the third party cryptography service and decrypting, by the data processing hardware, the encrypted content using the cryptographic key.

This aspect may include one or more of the following optional features. In some configurations, the decryption request includes an authentication token, the authentication token indicating that a requestor of the decryption request is authorized to receive the cryptographic key. The authentication token may include a JavaScript object notation (JSON) web token, the JSON web token including a signature based on a public key infrastructure (PKI) certificate.

In some implementations, the access control condition includes a user-configured access control condition for the content. The third party cryptography service may originally encrypt the encapsulation using a symmetric encryption with a key encryption key (KEK). The third party cryptography service may correspond to a key service manager (KSM) of a distributed storage system or a hardware security module (HSM) device of a distributed storage system. The access control condition may correspond to a respective condition for dynamic access control.

Another aspect of the disclosure provides a system for wrapped keys with access control predicates. The system includes data processing hardware and memory hardware in communication with the data processing hardware. The memory hardware stores instructions that when executed on the data processing hardware cause the data processing hardware to perform operations. The operations include obtaining a cryptographic key for content associated with a user, encrypting the content using the cryptographic key, and generating an encryption request. The encryption request requests that a third party cryptography service encrypts an encapsulation of the cryptographic key and an access control condition governing access to the content of the user. The operations also include communicating the encryption request to the third party cryptography service, the encryption request including the cryptographic key.

This aspect may include one or more of the following optional features. In some implementations, the encryption request includes the access control condition, the access control condition configured by the user associated with the content. The encryption request requesting that the third party encrypts the encapsulation may include the encryption request requesting the third party cryptography service to encrypt the encapsulation using a symmetric encryption with a key encryption key (KEK). The third party cryptography service may correspond to a key service manager (KSM) of a distributed storage system or a hardware security module (HSM) device of a distributed storage system. The access control condition may correspond to a respective condition for dynamic access control.

In some examples, the operations include receiving a decryption request to decrypt the encrypted content associated with the user and include communicating to the third party cryptography service, the decryption request to decrypt the encapsulation of the cryptographic key for the content and the access control condition governing access to the content of the user subject to the decryption request. In this example, when the decryption request satisfies the access control condition, the operations include retrieving the cryptographic key from the third party cryptography service and decrypting the encrypted content using the cryptographic key. Here, the decryption request may include an authentication token, the authentication token indicating that a requestor of the decryption request is authorized to receive the cryptographic key. The authentication token may include a JavaScript object notation (JSON) web token, the JSON web token including a signature based on a public key infrastructure (PKI) certificate.

Yet another aspect of the disclosure provides a system for wrapped keys with access control predicates. The system includes data processing hardware and memory hardware in communication with the data processing hardware. The memory hardware stores instructions that when executed on the data processing hardware cause the data processing hardware to perform operations. The operations include receiving a decryption request to decrypt encrypted content associated with a user and communicating to a third party cryptography service. The decryption request decrypts an encapsulation of a cryptographic key for the content and an access control condition governing access to the content of the user subject to the decryption request, the encapsulation originally encrypted by the third party cryptography service. When the decryption request satisfies the access control condition, the operations include retrieving the cryptographic key from the third party cryptography service and decrypting the encrypted content using the cryptographic key.

In some configurations, the decryption request includes an authentication token, the authentication token indicating that a requestor of the decryption request is authorized to receive the cryptographic key. Here, the authentication token may include a JavaScript object notation (JSON) web token, the JSON web token including a signature based on a public key infrastructure (PKI) certificate.

In some examples, the access control condition includes a user-configured access control condition for the content. The third party cryptography service may originally encrypt the encapsulation using a symmetric encryption with a key encryption key (KEK). The third party cryptography service may correspond to a key service manager (KSM) of a distributed storage system or a hardware security module (HSM) device of a distributed storage system. The access control condition may correspond to a respective condition for dynamic access control.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A client of a cloud provider may have security practices that the client does not assume trust (in the cryptographic/security sense) of its cloud service provider(s). For example, the client may wish to encrypt data stored or handled by the provider, but also may wish to avoid trusting the provider to handle the corresponding encryption keys. In the examples shown, the cloud computing environment 100 includes a hybrid content protection architecture. In this architecture, the client uses the CCP to encrypt and/or decrypt client content with a cryptographic key managed by a third party. With this configuration, encryption protects the client content from the risk of client content exposure at the CCP while the third party with the key does not possess the client content to perform decryption. In other words, neither the CCP nor the third party possesses all the tools simultaneously to expose the client data. Using this architecture, the client may take advantage of the CCP without having to fully trust it.

Although a hybrid content protection architecture may protect client secrets from, for example, administrators of the CCP, clients may also prefer that the architecture includes a mechanism that enables a storage system to hold secrets protected cryptographically with fine-grained access control. In other words, clients may prefer that the third party manages access control to client secrets as well. Unfortunately, there is currently a tradeoff that in order for a third party to provide fine-grained access control, the third party may need to actually store the content of the secret as well as an access control mechanism (e.g., an access control list (ACL)). Therefore, providing fine-grained access control for cryptographically protected secrets potentially defeats an important concept of the hybrid content protection architecture; that a single party does not possess all the tools to simultaneously expose client secrets (e.g., client data that the client wishes to be private). To address the inherent issues with this tradeoff, the cloud computing environment 100 includes a third party cryptographic service that uses access control predicates to protect and/or to manage secrets for the client.

Figure 1A:
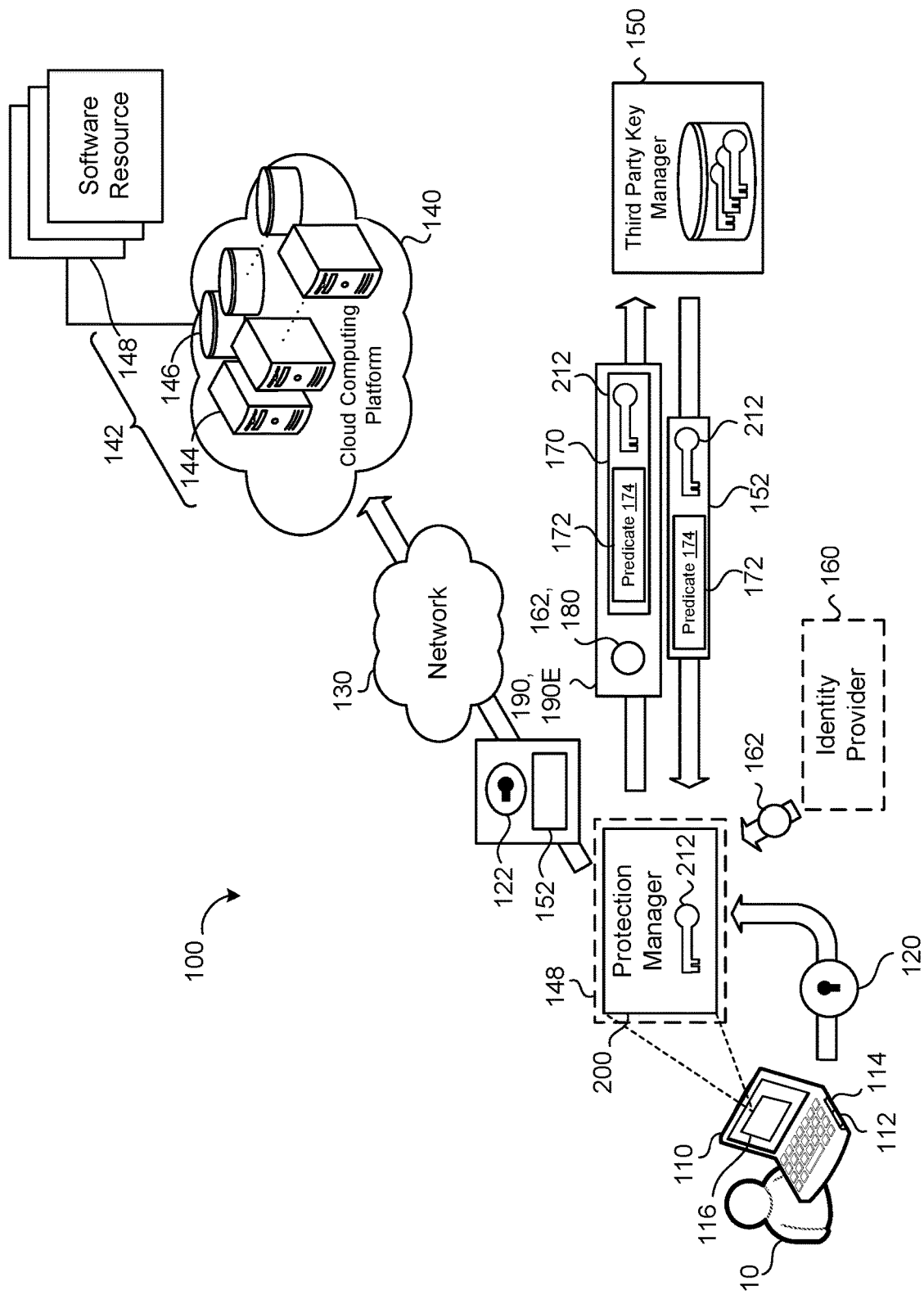
FIGS. 1A and 1B are schematic views of example computing environments using a data cryptography system.
Figure 1B:
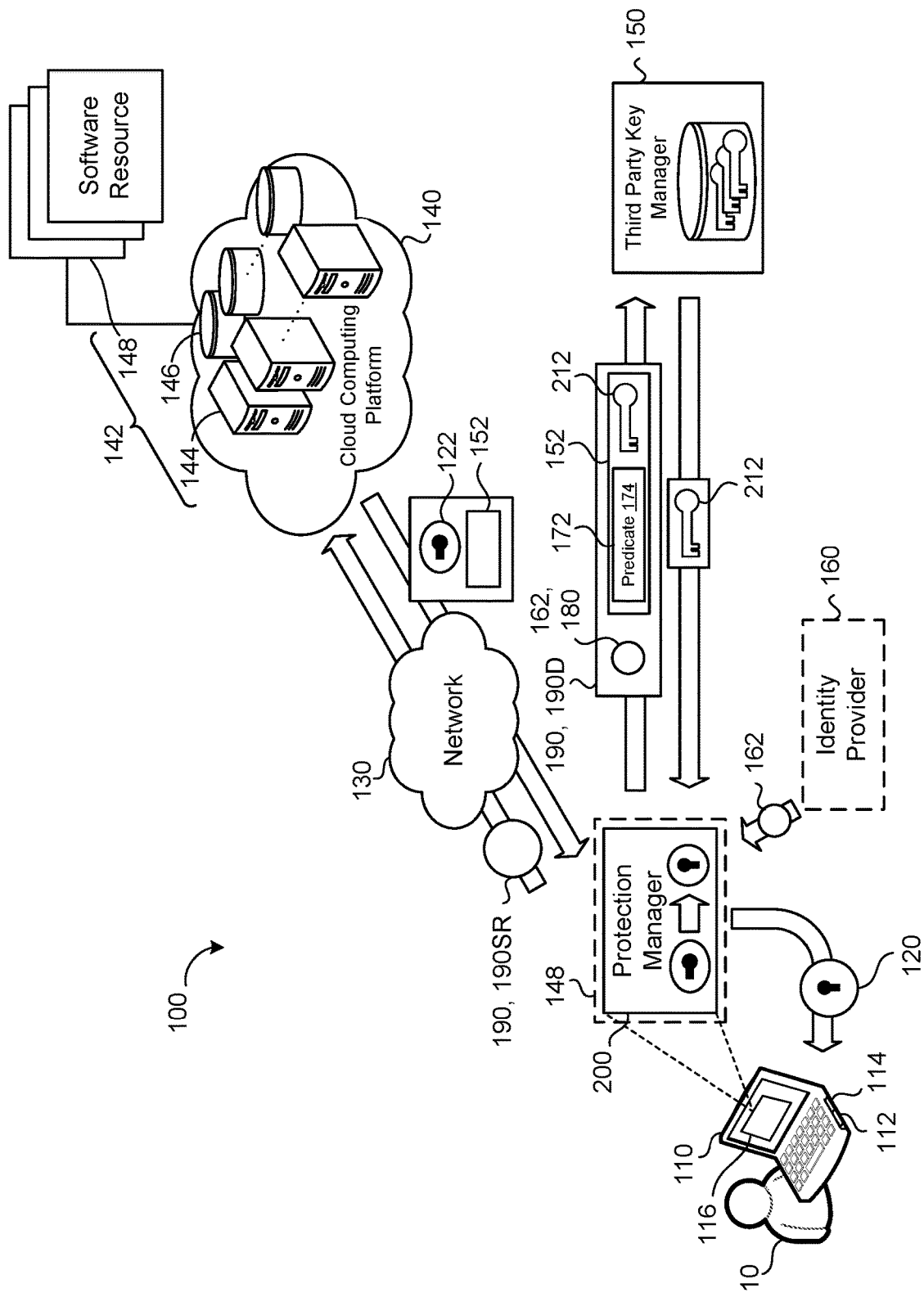

FIGS. 1A and 1B are examples of a cloud computing environment 100. The cloud computing environment 100 generally includes a user device 110 (e.g., also referred to as a client device) associated with a user 10 (e.g., also referred to as a client) that is capable of communicating user content 120 (e.g., also referred to as client content/data) over a network 130 to a portion (e.g., a backend) of a CCP 140. The CCP 140 may refer to a distributed system having scalable/elastic resources 142 (e.g., a storage abstraction) remote from local resources of the user device 110. The resources 142 include hardware resources 144 (e.g., data processing hardware), storage resources 146 (e.g., memory hardware), and/or software resources 148 (e.g., client-facing software such as web-based applications or application programming interfaces (APIs)). In some examples, the user 10 interfaces with the resources 142 of the CCP 140 using the user device 110 (e.g., using a web-browser application 116). In some configurations, when the user 10 interfaces with software resources 148 of the CCP 140, the software resources 148 include cryptographic signatures to provide code integrity protection.

The user device 110 can be any computing device or data processing hardware capable of communicating with the CCP 140. Some examples of user devices 110 include, but are not limited to, desktop computing devices, mobile computing devices, such as laptops, tablets, smart phones, and wearable computing devices (e.g., headsets and/or watches). As a computing device, the user device 110 includes data processing hardware 112 and memory hardware 114 configured to communicate with the data processing hardware 112 to execute various processes. Here, FIGS. 1A and 1B depict the user device 110 using data processing hardware 112 to execute applications 116 (e.g., applications that have been downloaded and stored in the memory hardware 114). For instance, the user device 110 executes a web-browser application 116 to communicate with the CCP 140. Here, the CCP 140 may offer web-based services accessible to the user device 110 via the web-browser application 116.

In some examples, when the user 10 interacts with the CCP 140, the user 10 provides and/or generates user content 120. For example, the user 10 generates user content 120 at a user interface (UI) for an application (i.e., a software resource 148) of the CCP 140. User content 120 generally refers to data owned or controlled by the user 10, such as files, documents, messages, or other data assets. In some examples, the user 10 provides the user content 120 to the CCP 140 in order for the CCP 140 to perform various client services (e.g., storage services, computing services, etc.). In some implementations, the user content 120 simply refers to content (e.g., a resource) that is compatible with the CCP 140 or a service associated with the CCP 140.

When the user 10 introduces user content 120 to the CCP 140, a protection manager 200 is configured to identify the user content 120 as a potential candidate for content protection. In some examples, the protection manager 200 is a client-facing function of a portion of the CCP 140. For instance, the CCP 140 integrates the protection manager 200 in the frontend code of one or more CCP applications (e.g., a client-facing library embedded into code paths that manage user data at a CCP application). By integrating the protection manager 200 in frontend code of CCP applications, the CCP recognizes that, when a user 10 provides or shares user content 120 with the CCP 140, the user 10 may want to protect the user content 120. Furthermore, by being client-facing, the protection manager 200 affords the user 10 with the opportunity to protect user content 120 before the user 10 cedes total control of the user content to the CCP 140. For instance, the user 10 wants to store the user content 120 in the storage resources 146 (e.g., servers) of the CCP 140, but opts to protect the user content 120 at the protection manager 200 before the user 10 communicates the user content 120 to the storage resources 146.

In some implementations, the user 10 initiates protection of user content 120 at the protection manager 200 (e.g., a user request for protection). In other implementations, the protection manager 200 identifies user content 120 and either automatically protects the user content 120 or protects the user content 120 with permission from the user 10. In yet other implementations, the protection manager 200 is configured such that both the user 10 may initiate a content protection request and the protection manager 200 may self-serve user content protection. In some examples, the user 10 or an administrator of the CCP 140 employing the protection manager 200 designates types of user content 120 that is in-scope for the protection manager 200. When the protection manager 200 receives and/or identifies the type of user content 120 that is in-scope, the protection manager 200 is configured to always protect the user content 120 before being communicated to a remote endpoint (e.g., remote resources 142 of the CCP 140).

To protect user content 120, the protection manager 200 is configured to encrypt and/or decrypt user content 120. For instance, the protection manager 200 encrypts user content 120 prior to an upload of the user content 120 to the remote resources 142 of the CCP 140 (e.g., as shown in FIG. 1A) and decrypts user contents 120 locally at the user device 110 after a download of the user contents 120 from remote resources 142 of the CCP 140 (e.g., as shown in FIG. 1). In storage-based CCP applications, the protection manager 200 may be injected into existing upload and/or download flows to provide its protection services to user content 120 that travels through these flow paths. In content editor applications, the protection manager 200 may be part of the local read/write functionality such that the protection manager 200 reads/writes blob versions for document-based user content 120 as the form of protection where the protection manager 200 encrypts/decrypts the blob versions.

When the protection manager 200 encrypts/decrypts the user content 120, the protection manager 200 is responsible for communication with third party systems such as the third party key manager 150 and/or the identify provider 160. For example, the protection manager 200 communicates with the third party key manager 150 and/or the identify provider 160 using hypertext transfer protocol secure (HTTPS) requests or cross-origin resource sharing (CORS) requests. Here, the third party key manager (3PKM) 150 refers to a third party cryptography service that protects a key 212 that the protection manager 200 uses to encrypt/decrypt user content 120.

In some examples, the 3PKM 150 is a service that protects a secret 170. The secret 170 may be provided to the 3PKM 150 by the protection manager 200 (e.g., on the user's behalf) or by the user 10 separately from the protection manager 200. A secret 170 collectively refers to content provided to the 3PKM 150 to be protected. The content of the secret 170 may include the key 212 and/or a perimeter 172. A perimeter 172 is an object or declaration that defines a predicate 174 where the predicate 174 corresponds to an access control condition governing the contents of the secret 170. In other words, the condition set by the predicate 174 needs to be satisfied in order to access the contents of the secret 170. In some examples, satisfying the condition set by the predicate 174 allows an entity (e.g., the user 10) to use the cryptography services of the 3PKM 150, such as receiving encrypted or decrypted content. In some implementations, satisfying the condition set by the predicate 174 permits the 3PKM 150 to communicate contents associated with the secret 170. For instance, when a requesting entity satisfies a predicate 174, the 3PKM 150 may return the key 212 associated with the predicate 174 to the requesting entity such that the encrypted content 122 may be decrypted by the key 212 (e.g., at the protection manager 200). The third party cryptography service 150 may correspond to a key service manager (KSM) of a distributed storage system or a hardware security module (HSM) device of a distributed storage system.

An example of a perimeter 172 may be a list of email addresses that are permitted to access the user content 120 associated with the key 212. In some configurations, the perimeter 172 includes a predicate 174 that specifies a requirement that an authorization assertion needs to be provided to the 3PKM 150 in order to access the content of the secret 170. In some configurations, the perimeter 172 may have different predicates 174 for different operations to be performed in relation to the secret 170. The perimeter 172 may include static checks (e.g., checking that a specific assertion is equal to a value) or dynamic checks (e.g., checking an assertion using another party, such as the identity provider 160). Stated differently, a static check may be a static access control condition while a dynamic check is a dynamic access control condition (e.g., multiple claims 180 or assertions may be chained or mapped together satisfy dynamic access control conditions).

In some configurations, the 3PKM 150 includes a key management system (KMS) or a hardware management system (HMS) that protects the secret 170 when the secret 170 is received at the 3PKM 150. The 3PKM 150 may protect the secret 170 by wrapping/unwrapping processes. Here, wrapping refers to a cryptographic process (e.g., a key wrapping algorithm) that uses symmetric encryption to encapsulate content, such as secret material (e.g., the key 212). Unwrapping generally refers to the reverse process where the encapsulated content (e.g., the secret material) is decrypted using a cryptographic process. To wrap/unwrap the secret 170, the 3PKM 150 may receive the secret 170 and encrypts/decrypts the secret 170 using a key encryption key (KEK) that permanently resides in the 3PKM 150 (e.g., at the KMS or the HMS). Here, the 3PKM 150 may be configured such that the 3PKM 150 includes a KEK corresponding to each customer (e.g., each user similar to the user 10) of the 3PKM 150. When the 3PKM 150 receives the secret 170 from the protection manager 200, the 3PKM 150 protects the secret 170 and returns an encapsulation 152 to the protection manager 200. Here, the encapsulation 152 refers to an object encrypted by the 3PKM 150 to form an encrypted data structure. For instance, the encapsulation 152 returned to the protection manager 200 may be an encrypted form of the secret 170. In some examples, the encapsulation 152 is a cryptographic token 152 that corresponds to an encrypted form of the key 212 when the KEK encrypts the key 212. After the key 212 has been wrapped by the 3PKM 150, the 3PKM 150 may store the protected key 212 (i.e., wrapped key) or send the protected key 212 (i.e., wrapped key) to another storage location (e.g., at the user device 110 of the client 10 or at the CCP 140). In some implementations, storing the key 212 that has been encrypted by the 3PKM 150 with the encrypted user content 122 may provide benefits such as consistent data location, backup, and/or reliability.

Although the 3PKM 150 may store keys, such as KEKs for protecting user content 120, the 3PKM 150 does not store the user content 120 in any form (e.g., encrypted or decrypted). Rather, the protection manager 200 encrypts the user content 120 with a key 212 (e.g., a client-side cryptographic key) at the user device 110 and communicates the encrypted user content 122 and the encapsulation 152 from the 3PKM 150 to remote resources 142 of the CCP 140. Based on this configuration, the CCP 140 has encrypted user content 122 with an associated encapsulation 152, but no key is accessible to the CCP 140 to decrypt the user data 120.

During each of the wrapping/unwrapping processes, the 3PKM 150 may receive claim(s) 180. Here, a claim 180 refers to information conveyed to the 3PKM 150 that specifies one or more properties to be evaluated against the predicates 174 of the perimeter 172. In other words, a claim 180 may be an assertion by an entity (e.g., the user 10) that the entity should have access to a particular secret 170. Here, the properties of the assertion for the claim 180 may depend on the predicates 174 configured for access conditions to the secret 170. For instance, the 3PKM 150 receives a request 190 (e.g., a decryption request 190D) that includes an encapsulation 152 and a claim 180. When the 3PKM 150 receives the request 190, the 3PKM 150 may first verify the validity of the claim 180 and then determine if the claim 180 satisfies the conditions of the predicate 174. When the claim 180 satisfies the predicate 174, the 3PKM 150 may return the original content related to the encapsulation 152 (e.g., the secret 170).

In some examples, the claim 180 includes authorization features (e.g., an authorization token 162) designated by the identity provider 160. The identity provider 160 generally refers to a third party separate from the CCP 140 that may provide authorization features used to validate an entity. In other words, the identity provider 160 is configured to indicate that an entity possessing an authorization feature has a right to place a claim 180 on content or a particular resource within the environment 100. In some examples, the identity provider 160 generates a signature or a certificate for an entity (e.g., for the user 10 or another user associated with the CCP 140) to validate an identity of the entity. For example, the authentication token corresponds to a JavaScript object notation (JSON) web token where the JSON web token includes a signature based on a public key infrastructure (PKI) certificate. The authorization features generated by the identity provider 160 may then be used by the 3PKM 150 to initially validate a claim 180 before checking the conditions of the predicate 174.

Authorization features help ensure that an unauthorized party does not try to gain possession of the secret 170 (e.g., key 212) using the 3PKM 150. For example, an unauthorized party may attempt to impersonate the user 10 to the 3PKM 150. The 3PKM 150 and/or the identity provider 160 may be configured prevent unilateral access to keys 212 at the 3PKM 150 by an entity of the CCP 140 that has not been validated. In other words, since an entity of the CCP 140 may have access to the encrypted user content 122, further access to the key 212 at the 3PKM 150 would potentially remove the protection and expose the user content 120. Due to this possibility, the identity provider 160 is configured to provide authentication features for an entity that should have access to the secret 170 (e.g., to decrypt the user content 120 for the user 10). To illustrate, the protection manager 200 at the user device 110 of the user 10 should have access to retrieve the key 212 from the 3PKM 150. Here, the identity provider 160 provides an authentication token 162 to the protection manager 200 at the user device 110 such that the protection manager 200 may provide the authentication token 162 (e.g., in a claim 180) to the 3PKM 150 during a key retrieval request (e.g., a decryption request 190D). In some examples, when the 3PKM 150 receives an authentication token 162, the 3PKM 150 determines whether the entity identified by the authentication token 162 has authorization to access the requested key (e.g., based on an ACL at the 3PKM 150). When the 3PKM 150 determines that the authentication token 162 is received from an authorized entity, the 3PKM 150 complies with the key request by returning the requested key 212. For example, in FIG. 1B, the 3PKM 150 returns a key 212 included in the encapsulation 152 based on the decryption request 190D from an entity (e.g., the protection manager 200 at the user device 110) that is authorized according to the claim 180.

With continued reference to FIG. 1A, the protection manager 200 obtains a key 212 (e.g., a cryptographic key) to protect the user content 120. Here, the key 212 may be obtained from multiple sources considered to be secure. The sources may include applications 116 at the user device 110 (e.g., a web-browser application), hardware 112, 114 of the user device 110, or some remote source that the user 10 trusts to be secure (e.g., a key server or remote service that generates keys 212). With the key 212, the protection manager 200 locally encrypts the user content 120 to form encrypted user content 122. Once the protection manager 200 forms the encrypted user content 122, the key 212 is communicated to the 3PKM 150 in order be wrapped into an encapsulation 152 by the 3PKM 150. When the 3PKM 150 wraps the encapsulation 152, it may return the encapsulation 152 to the protection manager 200. When the protection manager 200 receives the encapsulation 152, the protection manager 200 communicates the encrypted user content 122 along with the encapsulation 152 to the remote computing resources 142 of the CCP 140.

For the encryption process depicted in FIG. 1A, the protection manager 200 (e.g., directed by the user 10) may generate an encryption request 190, 190E. In some examples, the encryption request 190E includes the secret 170. In these examples, the secret 170 communicates the key 212 that the protection manager 200 used to encrypt the content 120 along with a perimeter 172 that identifies access control conditions (i.e., predicate(s) 174). In some implementations, the encryption request 190 includes a claim 180 that asserts that the party requesting the encryption request 190E is authorized to use the services of the 3PKM 150. The 3PKM 150 receives the encryption request 190E and performs a wrap operation for the secret 170. The wrap operation includes, as an input, bytes that the encryption request 190E identifies the 3PKM 150 to protect. For instance, the encryption request 190E requests that the wrap operation protects the key 212 as well as the perimeter 172. Here, by protecting the perimeter 172 with the one or more predicates 174, the 3PKM 150 forms an encapsulation 152 that is an encrypted form of the key 212 bundled with the perimeter 172 (e.g., the access control conditions of the predicate(s) 174). By encrypting the key 212 with the perimeter 172 (e.g., using a KEK), the process ensures that when decryption of the encapsulation 152 is needed, the 3PKM 150 can check access control conditions before returning the decrypted content (e.g., the key 212). In some configurations, the 3PKM 150 performs a symmetric encryption on the secret 170 using the KEK during the wrap operation. Additionally or alternatively, the 3PKM 150 may also be configured to perform asymmetric encryption during the wrap operation in response to the encryption request 190E.

In some implementations, the 3PKM 150 functions as a key access control list service (KACLS) in the environment 100. For example, the 3PKM 150 receives an encryption request 190E that includes a data encryption key (DEK) as the key 212 and ACL as a form of the perimeter 172. In some examples, as the KACLS, the encryption request 190E also includes an identifier for the user content 120. For instance, when the content 120 is a document (e.g., an email), the identifier is a document identifier (ID) (e.g., an alphanumeric set of characters associated with the document). Here, the ACL, much like other perimeters 172, may specify who can decrypt the content (e.g., corresponding to the document ID). In the case of an email encrypted using KACLS, the perimeter 174 can be set to specific recipients of the email content. Therefore, when an entity requests to decrypt the encrypted email content, the KACLS receives a request 190 (e.g., a decryption request 190, 190D) to decrypt the email (e.g., a DEK for the email). Here, the 3PKM 150, acting as a KACLS, will first verify that the decryption request 190D includes a valid claim 180 for decryption and then proceed to check whether the requestor of the decryption request 190D is a recipient identified by the perimeter 172. In other words, the 3PKM 150 may check whether the email recipient field of the claim 180 matches the email recipient identified by the perimeter 172.

In contrast, FIG. 1B depicts the protection manager 200 decrypting encrypted user content 122. Here, the encrypted user content 122 is downloaded to the user device 110 and the protection manager 200 decrypts the encrypted user content 122 locally at the user device 110. In this example, the protection manager 200 makes a retrieval request 190, 190SR to the CCP 140 (e.g., a remote resource 142 such as a server of the CCP 140). In some examples, the retrieval request 190SR includes a request for a particular piece of encrypted user content 122 along with its associated encapsulation 152. In some configurations, the CCP 140 is configured to identify that a retrieval request 190SR that specifies encrypted user content 122 should be fulfilled by accompanying the encapsulation 152 corresponding to the specified encrypted user content 122. Here, the user 10 may initiate the request 190SR at the user device 110. Once the protection manager 200 receives the encapsulation 152, the protection manager 200 communicates the encapsulation 152 to 3PKM 150 in order to retrieve the key 212 corresponding to the encapsulation 152. With the key 212 for the encrypted user content 122 from the 3PKM 150, the protection manager 200 decrypts the encrypted user content 122.

In some examples, the protection manager 200 retrieves the key 212 to decrypt the encrypted user content 122 by sending a decryption request 190D. The decryption request 190D includes the encapsulation 152 that embodies the secret 170 with the key 212 and the claim 180 (e.g., with an authorization token 162). Since the encapsulation 152 corresponds to the secret 170, the encapsulation 152 included in the request 190D also includes the perimeter 172 with one or more predicates 174. When the 3PKM 150 receives the decryption request 190D, the 3PKM 150 may first perform a validation process. During the validation process, the 3PKM 150 determines whether the claim 180 of the request 190D identifies a valid entity to submit the decryption request 190D. Following the validation process, the 3PKM 150 determines whether the request 190D (e.g., using the claim 180) satisfies the one or more predicates 174 of the perimeter 172. For instance, the 3PKM 140 identifies whether the claim 180 associated with the request 190D satisfies the conditions set forth by the predicate 174 included in the encapsulation 152. In some examples, to determine whether the request 190D satisfies the condition of the predicate(s) 174, the 3PKM 150 unwraps the encapsulation 152 to access the perimeter 172 with the predicate (s) 174. With this process, the 3PKM 150 does not necessarily need to store the encapsulations 152 and, in fact, it may be easier for a storage system, such as the CCP 140, to store the encapsulations 152 generally as compared to the 3PKM 150. Here, because only the 3PKM 150 has the tools that may decrypt the encrypted encapsulation 152 (e.g., the KEK) and the encapsulation 152 includes the perimeter 172, the 3PKM 150 is able to enforce access control conditions before returning the decrypted key 212 within the content of the encapsulation 152. In other words, this process allows the 3PKM 150 to perform a stateless key service. It also may avoid the need for the 3PKM 150 to read/write to a database for every wrap/unwrap operation. Using this encapsulation process with access control predicates, the 3PKM 150 may focus on the protection of the KEK rather than having to additionally handle database access control.

Figure 2:
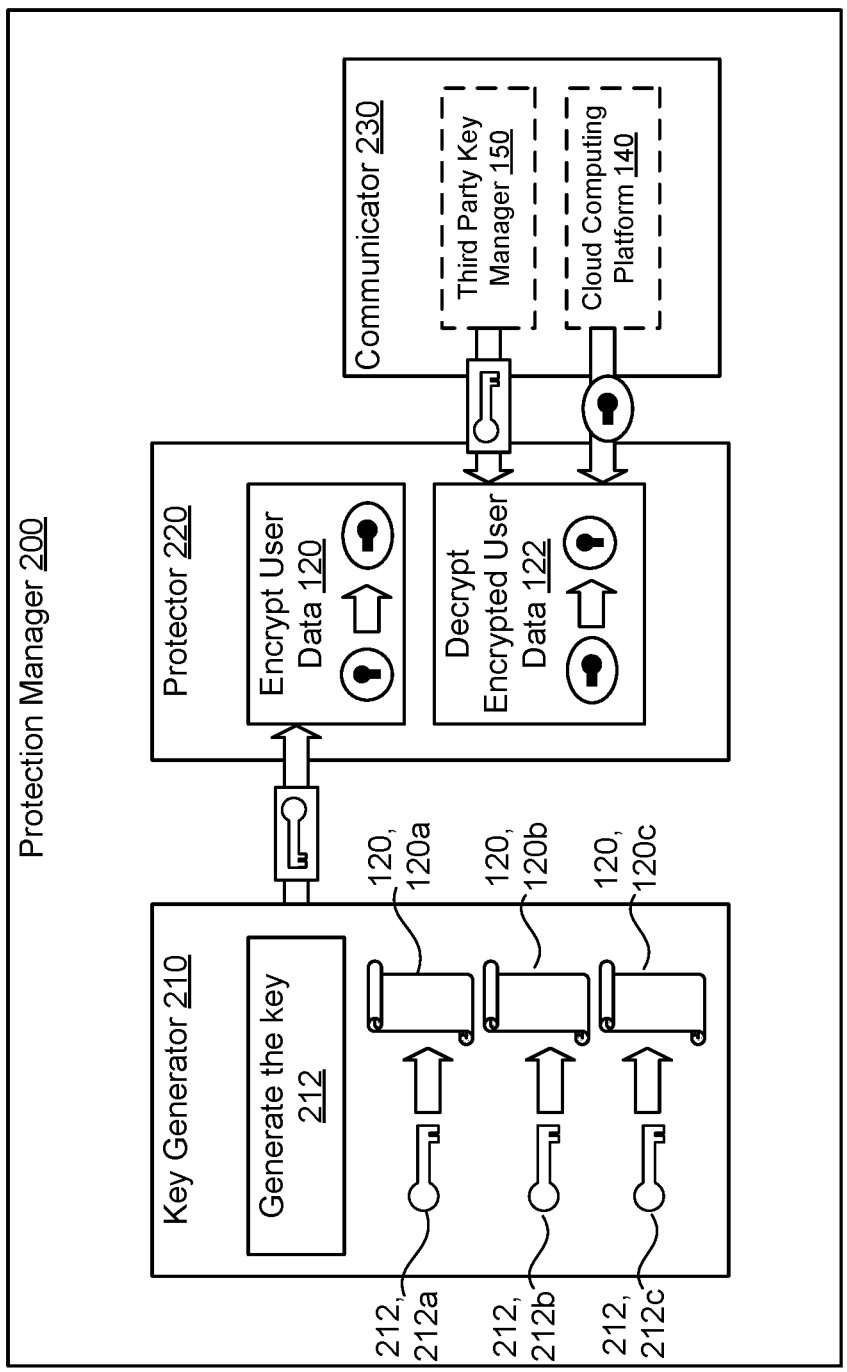
FIG. 2 is a schematic view of an example protection manager.

Referring to FIG. 2, the protection manager 200 includes a key generator 210, a protector 220, and a communicator 230. The key generator 210 is configured to generate the key 212 locally at the user device 110. In some examples, the key 212 is a cryptographic key 212 such that the key may be used to either encrypt or decrypt data, depending on the circumstances. In some examples, the key 212 is a 256-bit key. For instance, the key 212 uses an advanced encryption standard (AES) symmetric block cipher that operates with a 256-bit key size (e.g., length of 256 bits). Here, the block cipher may operate in a galois counter mode (GCM). With a cryptography algorithm, such as an AES-256-GCM, the key 212 provides both data authenticity (i.e., integrity) as well as data confidentiality. The key generator 210 may be configured to generate a key 212 for each individual piece of user content 120. For example, FIG. 2 shows three keys 212, 212*a-c* where each key 212 corresponds to a single piece of user content 120, 120*a-c*.

The protector 220 is the part of the protection manager 200 that is configured to encrypt or to decrypt the user content 120. To encrypt the user content 120, the protection manager 200 does not need any additional components from non-local entities (e.g., the CCP 140, the 3PKM 150, or the identity provider 160). In other words, the protector 220 receives the key 212 generated by the key generator 210 and is able to encrypt user content 120. In contrast, when the protector 220 decrypts encrypted user content 122, the protector 220 cannot autonomously operate. Instead the protector 220 leverages the communicator 230 to acquire the encrypted user content 122 from the CCP 140 (e.g., a server of the CCP 140) and the key 212 that originally encrypted the user content 120 from the 3PKM 150. Accordingly, the communicator 230 is configured to communicate with the non-local entities (e.g., the CCP 140, the 3PKM 150, or the identity provider 160) to enable the functionality of the protector 220.

Figure 3:
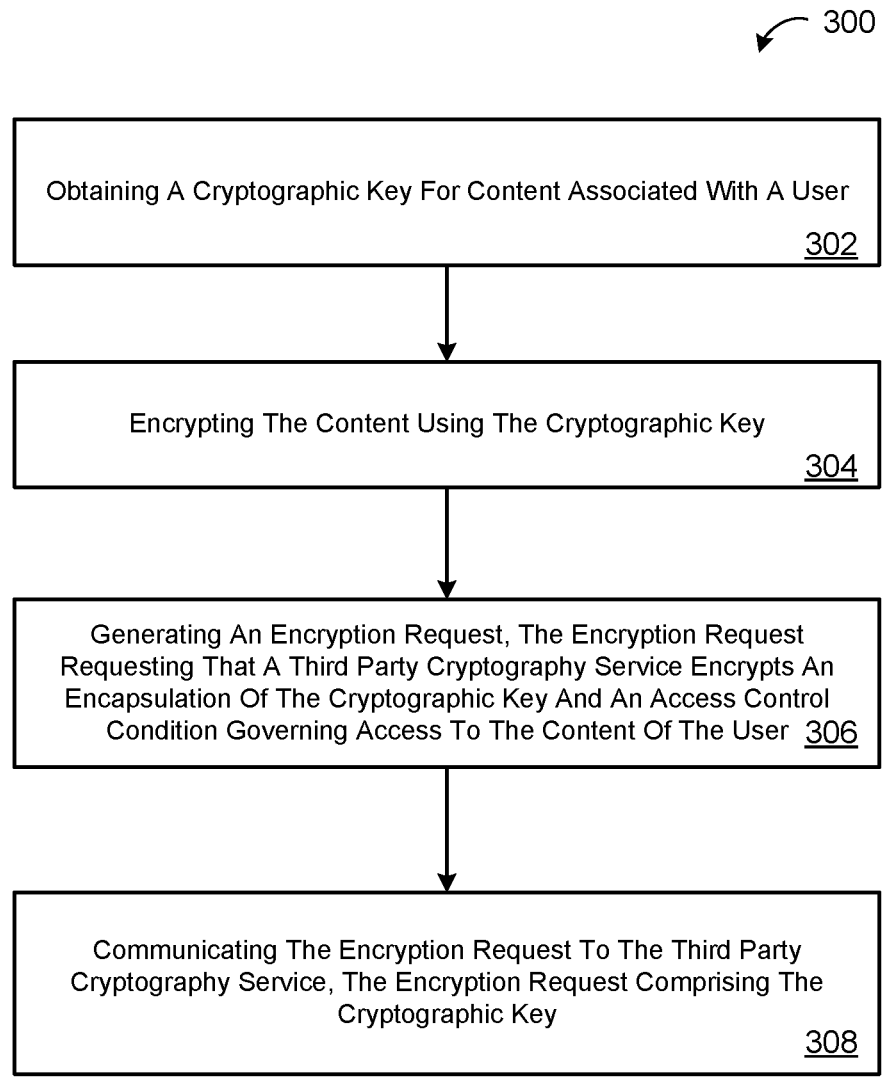
FIG. 3 is a flowchart of an example arrangement of operations for a method of encrypting user content using an access control predicate system.

FIG. 3 is an example arrangement of operations for a method 300 to encrypt user content 120. At operation 302, the method 300 obtains a cryptographic key 212 for content 120 associated with a user 10. At operation 304, the method 300 encrypts the content 122 using the cryptographic key 212. At operation 306, the method 300 generates an encryption request 190E where the encryption request 190E requests that a third party cryptography service 150 encrypts an encapsulation 152 of the cryptographic key 212 and an access control condition (e.g., the predicate 174 of the perimeter 172) governing access to the content 120 of the user 10. At operation 308, the method 300 communicates the encryption request 190E to the third party cryptography service 150 where the encryption request 190E includes the cryptographic key 212.

Figure 4:
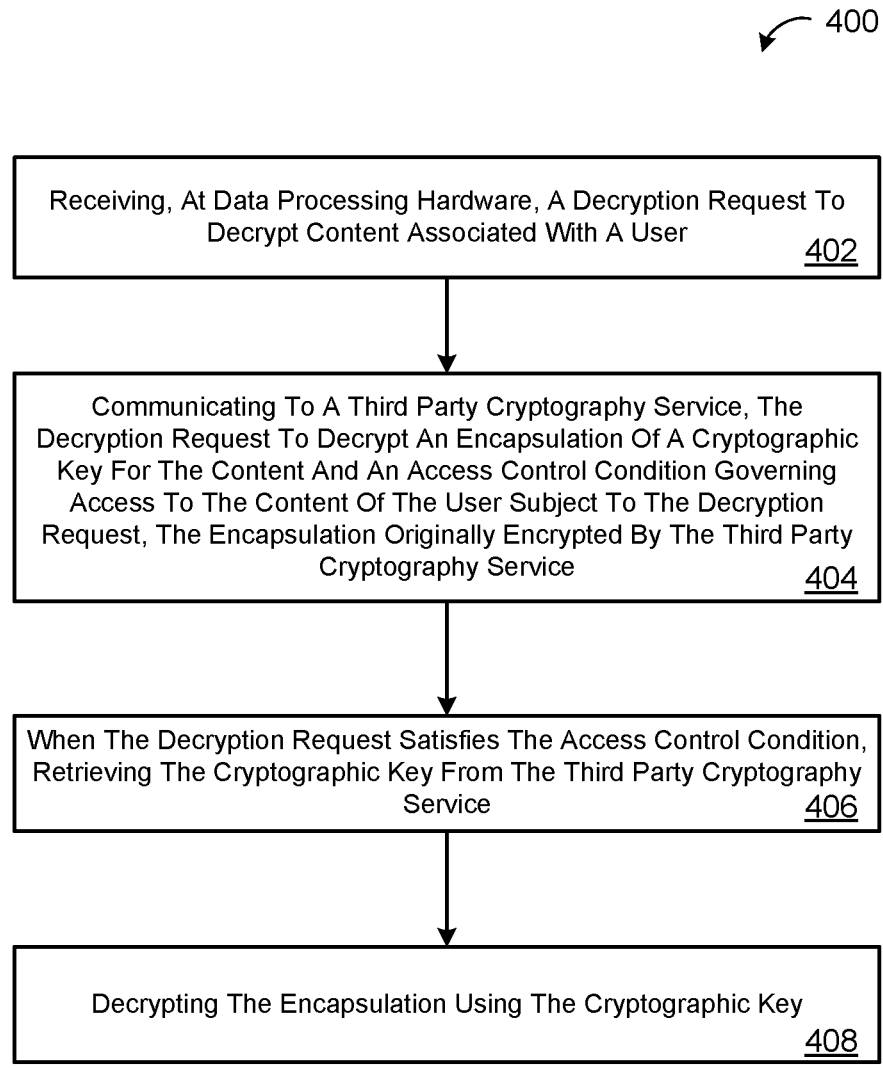
FIG. 4 is a flowchart of an example arrangement of operations for a method of decrypting user content using an access control predicate system.

FIG. 4 is an example arrange of operations for a method 400 to decrypt user content 120. At operation 402, the method 400 receives a decryption request 190D to decrypt encrypted content 122 associated with a user 10. At operation 404, the method 400 communicates, to a third party cryptography service 150, the decryption request 190D to decrypt an encapsulation 152 of a cryptographic key 212 for the content 122 and an access control condition (e.g., the predicate 174 of the perimeter 172) governing access to the content 120 of the user 10 subject to the decryption request 190D. Here, the encapsulation 152 was originally encrypted by the third party cryptography service 150. At operation 406, when the decryption request satisfies the access control condition, the method 400 retrieves the cryptographic key 212 from the third party cryptography service 150. At operation 408, the method 400 decrypts the encrypted content 122 using the cryptographic key 212.

Figure 5:
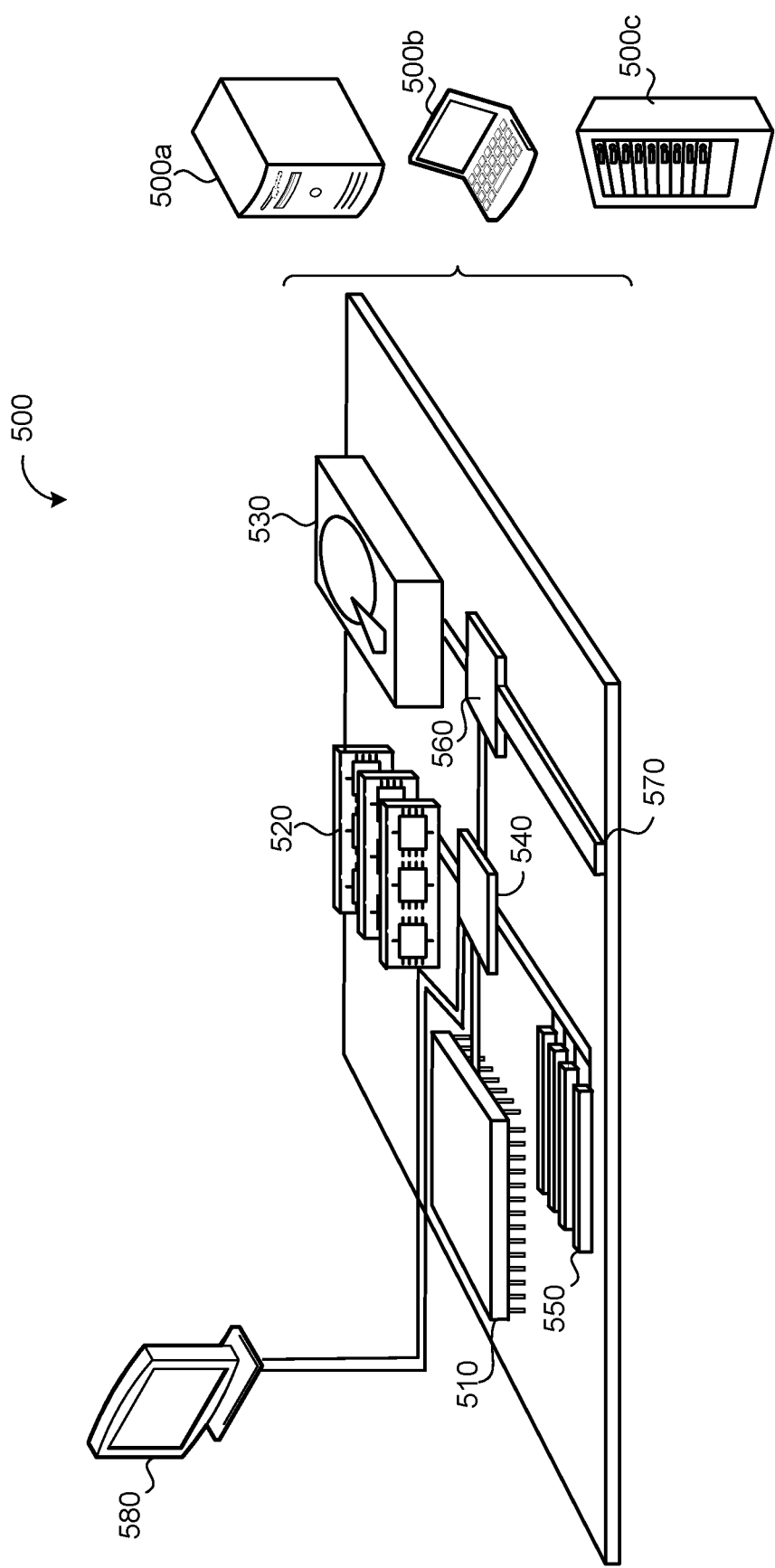
FIG. 5 is a schematic view of an example computing device that may be used to implement the systems and methods described herein.

FIG. 5 is schematic view of an example computing device 500 that may be used to implement the systems (e.g., the protection manager 200 and/or the 3PKM 150) and methods (e.g., methods 300, 400) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware), memory 520 (e.g., memory hardware), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
obtaining, at data processing hardware, a cryptographic key for content associated with a user;
encrypting, by the data processing hardware, the content using the cryptographic key;
generating, by the data processing hardware, an encryption request, the encryption request requesting that a third party cryptography service encrypts an encapsulation of the cryptographic key and a dynamic access control condition governing access to the content of the user, the dynamic access control condition requiring authentication from an entity remote from the third party cryptography service;
communicating, by the data processing hardware, the encryption request to the third party cryptography service, the encryption request comprising the encapsulation;
receiving, at the data processing hardware, a decryption request to decrypt the encrypted content associated with the user, the decryption request comprising a plurality of claims, each claim:
comprising an authentication token indicating that a requestor of the decryption request is authorized to receive the cryptographic key; and indicating one or more properties to be evaluated against the dynamic access control condition;

communicating, by the data processing hardware, to the third party cryptography service, the decryption request to decrypt the encapsulation of the cryptographic key for the content and the dynamic access control condition governing access to the content of the user subject to the decryption request; and when the third party cryptography service determines that the requestor corresponding to the authentication token of each claim of the plurality of claims is authorized and when the plurality of claims together satisfy the dynamic access control condition at the entity remote from the third party cryptography service:

retrieving, by the data processing hardware, the cryptographic key from the third party cryptography service; and decrypting, by the data processing hardware, the encrypted content using the cryptographic key.

2. The method of claim 1, wherein the encryption request further comprises the dynamic access control condition, the dynamic access control condition configured by the user associated with the content.

3. The method of claim 1, wherein the encryption request requesting that the third party cryptography service encrypts the encapsulation comprises the encryption request requesting the third party cryptography service to encrypt the encapsulation using a symmetric encryption with a key encryption key (KEK).

4. The method of claim 1, wherein the third party cryptography service corresponds to a key service manager (KSM) of a distributed storage system or a hardware security module (HSM) device of the distributed storage system.

5. The method of claim 1, wherein the authentication token comprises a JavaScript object notation (JSON) web token, the JSON web token comprising a signature based on a public key infrastructure (PKI) certificate.

6. A method comprising:

receiving, at data processing hardware, a decryption request to decrypt encrypted content associated with a user, the decryption request comprising a plurality of claims, each claim:

comprising an authentication token indicating that a requestor of the decryption request is authorized to receive a cryptographic key; and indicating one or more properties to be evaluated against a dynamic access control condition;

communicating, by the data processing hardware, to a third party cryptography service, the decryption request to decrypt an encapsulation of a cryptographic key for the encrypted content and the dynamic access control condition governing access to the encrypted content of the user subject to the decryption request, the dynamic access control condition requiring authentication from an entity remote from the third party cryptography service, the encapsulation originally encrypted by the third party cryptography service; and when the third party cryptography service determines that the requestor corresponding to the authentication token of each claim of the plurality of claims is authorized and when the plurality of claims together satisfy the dynamic access control condition at the entity remote from the third party cryptography service:

retrieving, by the data processing hardware, the cryptographic key from the third party cryptography service; and decrypting, by the data processing hardware, the encrypted content using the cryptographic key.

7. The method of claim 6, wherein the authentication token comprises a JavaScript object notation (JSON) web token, the JSON web token comprising a signature based on a public key infrastructure (PKI) certificate.

8. The method of claim 6, wherein the dynamic access control condition comprises a user-configured dynamic access control condition for the content.

9. The method of claim 6, wherein the third party cryptography service originally encrypted the encapsulation using a symmetric encryption with a key encryption key (KEK).

10. The method of claim 6, wherein the third party cryptography service corresponds to a key service manager (KSM) of a distributed storage system or a hardware security module (HSM) device of a distributed storage system.

11. A system comprising:

data processing hardware; and memory hardware in communication with the data processing hardware, the memory hardware storing instructions that when executed on the data processing hardware cause the data processing hardware to perform operations comprising:

obtaining a cryptographic key for content associated with a user;

encrypting the content using the cryptographic key;

generating an encryption request, the encryption request requesting that a third party cryptography service encrypts an encapsulation of the cryptographic key and a dynamic access control condition governing access to the content of the user, the dynamic access control condition requiring authentication from an entity remote from the third party cryptography service;

communicating the encryption request to the third party cryptography service, the encryption request comprising the encapsulation;

receiving a decryption request to decrypt the encrypted content associated with the user, the decryption request comprising a plurality of claims, each claim:

comprising an authentication token indicating that a requestor of the decryption request is authorized to receive the cryptographic key; and indicating one or more properties to be evaluated against the dynamic access control condition;

communicating to the third party cryptography service, the decryption request to decrypt the encapsulation of the cryptographic key for the content and the dynamic access control condition governing access to the content of the user subject to the decryption request; and when the third party cryptography service determines that the requestor corresponding to the authentication token of each claim of the plurality of claims are valid is authorized and when the plurality of claims together satisfy the dynamic access control condition at the entity remote from the third party cryptography service:

retrieving the cryptographic key from the third party cryptography service; and decrypting the encrypted content using the cryptographic key.

12. The system of claim 11, wherein the encryption request further comprises the dynamic access control condition, the dynamic access control condition configured by the user associated with the content.

13. The system of claim 11, wherein the encryption request requesting that the third party cryptography service encrypts the encapsulation comprises the encryption request requesting the third party cryptography service to encrypt the encapsulation using a symmetric encryption with a key encryption key (KEK).

14. The system of claim 11, wherein the third party cryptography service corresponds to a key service manager (KSM) of a distributed storage system or a hardware security module (HSM) device of the distributed storage system.

15. The system of claim 11, wherein the authentication token comprises a JavaScript object notation (JSON) web token, the JSON web token comprising a signature based on a public key infrastructure (PKI) certificate.

16. A system comprising:
    data processing hardware; and
    memory hardware in communication with the data processing hardware, the memory hardware storing instructions that when executed on the data processing hardware cause the data processing hardware to perform operations comprising:
        receiving a decryption request to decrypt encrypted content associated with a user, the decryption request comprising a plurality of claims, each claim:
            comprising an authentication token indicating that a requestor of the decryption request is authorized to receive a cryptographic key; and
            indicating one or more properties to be evaluated against a dynamic access control condition;
        communicating to a third party cryptography service, the decryption request to decrypt an encapsulation of a cryptographic key for the content and the dynamic access control condition governing access to the content of the user subject to the decryption request, the dynamic access control condition requiring authentication from an entity remote from the third party cryptography service, the encapsulation originally encrypted by the third party cryptography service;
        when the third party cryptography service determines that the requestor corresponding to the authentication token of each claim of the plurality of claims is authorized and when the plurality of claims together satisfy the dynamic access control condition at the entity remote from the third party cryptography service:
            retrieving the cryptographic key from the third party cryptography service; and
            decrypting the encrypted content using the cryptographic key.

17. The system of claim 16, wherein the authentication token comprises a JavaScript object notation (JSON) web token, the JSON web token comprising a signature based on a public key infrastructure (PKI) certificate.

18. The system of claim 16, wherein the dynamic access control condition comprises a user-configured dynamic access control condition for the content.

19. The system of claim 16, wherein the third party cryptography service originally encrypted the encapsulation using a symmetric encryption with a key encryption key (KEK).

20. The system of claim 16, wherein the third party cryptography service corresponds to a key service manager (KSM) of a distributed storage system or a hardware security module (HSM) device of the distributed storage system.

* * * * *